March 11, 1952     G. J. ROSENBERGER     2,589,140
PIE JUICE RETAINER
Filed March 9, 1950

George J. Rosenberger
INVENTOR.

Patented Mar. 11, 1952

2,589,140

UNITED STATES PATENT OFFICE 2,589,140

PIE JUICE RETAINER

George J. Rosenberger, Holden, Wash.

Application March 9, 1950, Serial No. 148,626

1 Claim. (Cl. 99—434)

This invention relates to a device for use by housewives for baking pie, the primary object of which is to make it possible for the pie juices to be retained within the pie during the entire baking process.

An important object of this invention is to provide a pie juice retaining device which is relatively simple in design and construction inexpensive to manufacture, and easy to assemble in the pie.

A further important object of this invention is to provide a pie juice retaining device which permits the circulation of the heated pie juices within the filling only of the pie with the result that the bottom crust does not become soggy and the top crust is pushed slightly off the filling thus assuring dry, flaky upper and lower crusts.

Yet another object of this invention is to provide a pie juice retaining device which saves the unpleasant experience of a smoked and smelling kitchen due to burned juices in the oven, which obviates the necessity of cleaning the oven and which assures the formation of a flaky well done crust which is easily digestible.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification reference characters indicate corresponding elements throughout.

Figure 1:
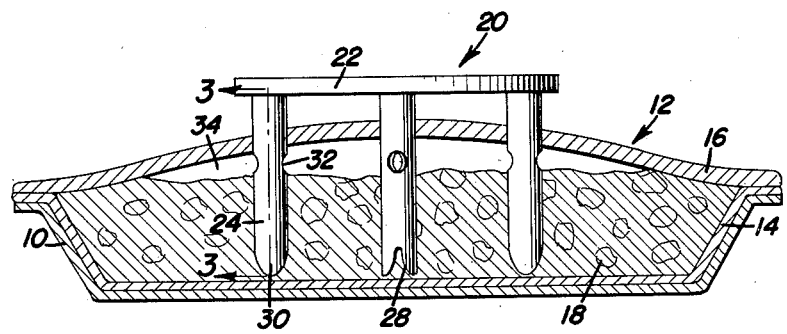
Figure 1 is a side elevational view of the present device shown positioned in a pie, the pie and pie pan being shown in section.
Figure 2:
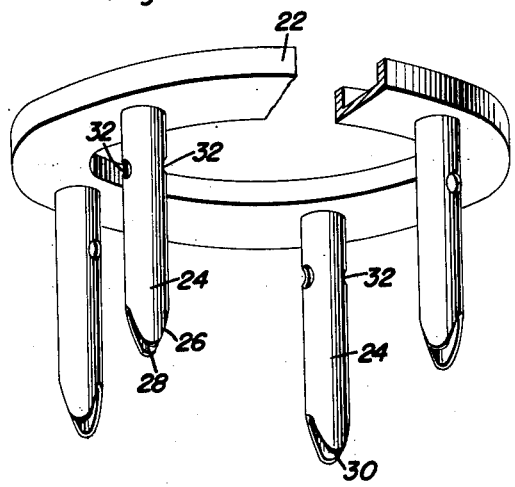
Figure 2 is a perspective view of the device itself with a portion of the ring broken away; and, Figure 3 is a sectional view taken substantially on the plane of section line 3—3 in Figure 1.
Figure 3:
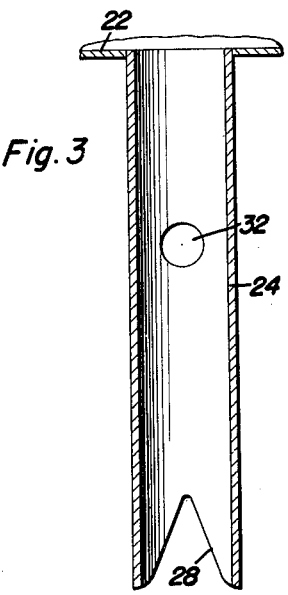

Indicated generally at 10 is a conventional pie pan in which is positioned a pie 12 consisting of a bottom crust 14, an upper crust 16, and a filling 18 between the crusts. The present device is generally indicated at 20 and is fabricated of suitable light-weight metals, such as aluminum alloys.

The device comprises a substantially flat, channel shaped ring 22 having a plurality of circumferentially spaced tubes 24 depending from the bottom surface of the ring, as shown clearly in the drawings. The lower free end of each of the tubes is preferably tapered as at 26 and includes an axially extending slot 28 which is open at the bottom and extends only part way up the tube. The free edges of the tube are preferably rounded as at 30 to prevent injury to the bottom crust 14 and extending through the wall of the tube beneath the ring 22 is a plurality of diametrically opposed apertures 32.

In use, the housewife grasps the ring 22 and gently pushes the tubes 24 through the upper crust 16 and filling 18 until the rounded free edges 32 of the tube just abut the inner surface of the bottom or lower crust 14 as shown clearly in Figure 1. This positions the diametrically opposed apertures 32 in each of the tubes a short distance below the inner surface of the upper crust 16. When the pie is baked, the heated juices expand up the tube through the axial slot 28 and spill out of the apertures 32 causing a circulation of the heated juices within the pie filling only of the pie with the result that the juices are kept off the bottom crust 14 preventing the same from becoming soggy. Also, the steam produced from the heated juices emitting from the apertures 32 just beneath the upper crust 16 create a lifting pressure on the upper crust so that it is somewhat raised as at 34 above the filling 18 with the result that the upper crust becomes dry and flaky as desired. Thus, the present device makes it possible to bake a pie in which the pie juices are retained while the upper and lower crusts remain dry and flaky in the finished product.

In view of the foregoing description taken in conjunction with the accompanying drawings it is believed that a clear understanding of the device will be quite apparent to those skilled in this art. A more detailed description is accordingly deemed unnecessary.

It is to be understood, however, that even through there is herein shown and described a preferred embodiment of the invention the same is susceptible to certain changes fully comprehended by the spirit of the invention as herein described and the scope of the appended claim.

Having described the invention, what is claimed as new is:

A pie juice retainer comprising a substantially flat channel shaped ring, and a plurality of depending tubes fixed to the bottom of said ring at circumferentially spaced points and communicating therewith, said tubes including bifurcated lower end portions and having discharge ports in their upper portions below the ring.

GEORGE J. ROSENBERGER.

REFERENCES CITED

The following references are of record in the file of this patent:

UNITED STATES PATENTS

| Number | Name | Date |
|---|---|---|
| 1,738,226 | Brewer | Dec. 3, 1929 |

FOREIGN PATENTS

| Number | Country | Date |
|---|---|---|
| 16,061 | Great Britain | Dec. 12, 1891 |
| 19,202 | Great Britain | May 26, 1910 |
| 44,887 | Germany | Oct. 6, 1888 |